US012780071B2

(12) United States Patent
K S et al.

(10) Patent No.: US 12,780,071 B2
(45) Date of Patent: Nov. 3, 2026

(54) DEADWEIGHT REDUCTION IN TIPPERS

(71) Applicant: VOLVO TRUCK CORPORATION, Gothenburg (SE)

(72) Inventors: Madhuchandra K S, Bangalore (IN); Sudeendra Thirtha Koushik K S, Bangalore (IN); Anjan Yvk, Bangalore (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 379 days.

(21) Appl. No.: 18/517,628

(22) Filed: Nov. 22, 2023

(65) Prior Publication Data

US 2024/0190324 A1 Jun. 13, 2024

(30) Foreign Application Priority Data

Dec. 12, 2022 (EP) .................................... 22212743

(51) Int. Cl.
*B60P 1/28* (2006.01)

(52) U.S. Cl.
CPC ............... *B60P 1/283* (2013.01); *B60P 1/286* (2013.01)

(58) Field of Classification Search
CPC ........... B60P 1/283; B60P 1/1286; B60P 1/28; B60R 9/045; B65G 7/40; B65G 67/40; A63H 17/06
See application file for complete search history.

(56) References Cited

U.S. PATENT DOCUMENTS

| | | | | |
|---|---|---|---|---|
| 6,764,138 B1 | | 7/2004 | Johnas | |
| 2023/0294586 A1 | * | 9/2023 | Behling | B07C 5/36 414/469 |

FOREIGN PATENT DOCUMENTS

| | | | | | |
|---|---|---|---|---|---|
| CN | 101905671 A | * | 12/2010 | | |
| CN | 205951792 U | * | 2/2017 | | |
| CN | 108116295 A | * | 6/2018 | | B60P 1/16 |
| CN | 110606013 A | * | 12/2019 | | B60P 1/16 |
| FR | 2140849 A5 | | 1/1973 | | |
| FR | 2944488 A1 | | 10/2010 | | |
| KR | 900006263 Y1 | * | 7/1990 | | B60P 1/28 |
| RU | 2218282 C1 | | 12/2003 | | |
| WO | 22100864 A1 | | 5/2022 | | |

OTHER PUBLICATIONS

Extended European Search Report in corresponding European Application No. 22212743.3 dated Jun. 2, 2023 (5 pages).

* cited by examiner

*Primary Examiner* — Daniel J Colilla
(74) *Attorney, Agent, or Firm* — Jeffri A. Kaminski; Venable LLP

(57) ABSTRACT

A tipper arrangement for a vehicle includes a tipper body for carrying a load; a movable ejection board mechanically attached to at least one an ejection arm at a front of the tipper body inside the tipper body, the at least one ejection arm is pivotable attached with respect to the tipper body and extend to below the tipper body; an actuator configured to rotate the at least one ejection arm from an initial position in which the at least one ejection arm is in mechanical contact with a stopper element below the tipper body that prevent rotation of the at least one ejection arm, to a rotated position in which the at least one ejection arm is rotated about a pivot axis to cause a motion of the ejector board towards the rear of the tipper body to expel load from the front of the tipper body.

20 Claims, 6 Drawing Sheets

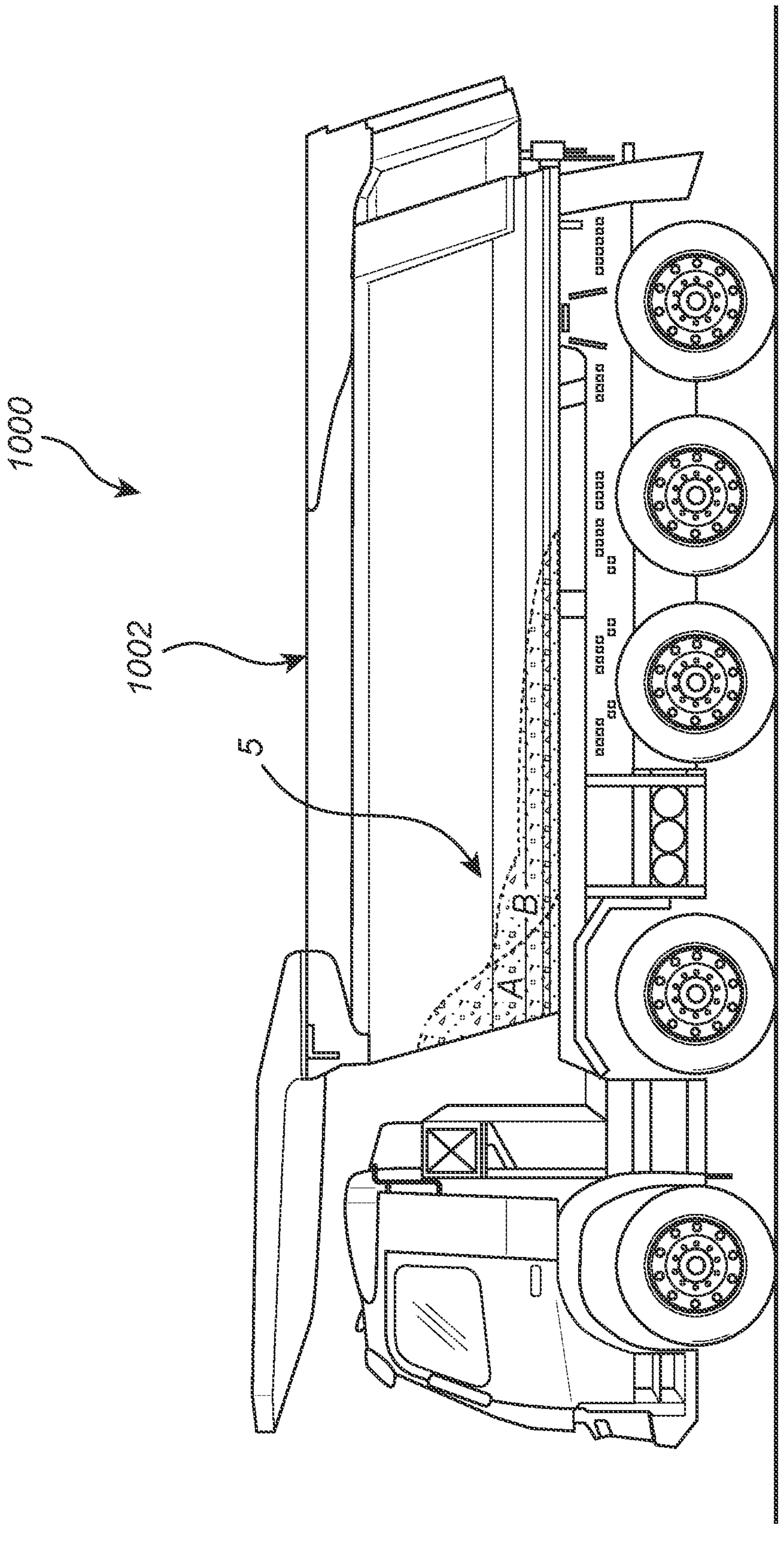
Fig. 1 (PRIOR-ART)

DEADWEIGHT REDUCTION IN TIPPERS

TECHNICAL FIELD

The disclosure relates generally to a tipper arrangement for a vehicle. In particular aspects, the disclosure relates to deadweight reduction in tippers. The disclosure can be applied in heavy-duty vehicles, such as trucks, buses, and construction equipment. Although the disclosure may be described with respect to a particular vehicle, the disclosure is not restricted to any particular vehicle.

BACKGROUND

For tipper vehicles it is of importance that as much as possible of the load is unloaded when intended. It is often observed that after tipping, a portion of load often gets stuck due the nature of design of tipper structures.

This stuck material, or residual load, cause so-called deadweight which effectively reduces the amount of material that can be loaded in subsequent transport cycles. This requires additional time consuming and environmentally disadvantageous transport cycles to transport a given amount of load. In many applications, such as heavy construction and mining trucks, payload matters a lot to the efficiency of an overall fleet operation and stuck material should be avoided.

SUMMARY

According to a first aspect of the disclosure, there is provided a tipper arrangement for a vehicle, comprising: a tipper body for carrying a load; a movable ejection board mechanically attached to at least one an ejection arm at a front of the tipper body inside the tipper body, the at least one ejection arm is pivotable attached with respect to the tipper body and extend to below the tipper body; an actuator configured to rotate the at least one ejection arm from an initial position in which the at least one ejection arm is in mechanical contact with a stopper element below the tipper body that prevent rotation of the at least one ejection arm, to a rotated position in which the at least one ejection arm is rotated about a pivot axis to cause a motion of the ejector board towards the rear of the tipper body to expel load from the front of the tipper body.

The first aspect of the disclosure may seek to provide a simple yet robust way of reducing the amount of residual deadweight that is left in the tipper body after a tipping action. Furthermore, the first aspect of the disclosure may provide for a mechanical solution with reduced risk of failure due to its robustness.

According to one example, when the tipper body is in a normal loading position the at least one ejection arm is in mechanical contact with the stopper element. A technical benefit may be that the stopper element provides for a robust way of preventing the ejection arm from rotating when the tipper body is in a normal loading position. The normal loading position may be that the tipper body is substantially horizontal so that load maintains by gravity in the tipper body.

In one example, the ejection board may be mechanically attached to a first end portion of the at least one ejection arm on one side of the pivot point of the at least one ejection arm and the mechanical contact between the at least one ejection arm and the stopper element is on a second end portion of the at least one ejection arm on the opposite end of the ejection arm with respect to the pivot point.

Hereby, the ejection arm is used as a relatively longer lever to provide a higher ejection force on the residual load in the tipper body via the ejection board.

In one example, the at least one ejection arm may be substantially L-shaped. This advantageously provides for arranging the second end portion under the tipper body where it can be packaged in a compact way.

In one example, the actuator is a resilient actuator such as a spring or a torsion bar. A resilient actuator advantageously provides for a simple and robust way of timely apply a force on the ejection arm as the tipper body moves from a normal loading position to a tipping position to expel load from the front of the tipper body.

In one example, the resilient actuator may be biased between the second end portion of the at least one ejection arm and the underside of the tipper body, wherein the spring action push the second end portion of the at least one ejection arm away from the underside of the tipper body. The underside is the side opposite, and vertically, from the side where the load is located. The underside faces the chassis of the vehicle.

In one example, a fixed end of the resilient actuator may be attached to the tipper body and the other end is a free end that push on the ejection arm. The fixed end may reduce the risk of losing the resilient actuator, and the free end may ensure that the resilient actuator force is fully utilized, i.e., the free does not pull the ejector arm back after release.

In one example, the actuator may be assisted by one of a pneumatic actuator, a hydraulic actuator, and an electric actuator. For example, the assisting actuator may be activated in response to that the at least one ejection arm loses contact with the stopper element.

In one example, the ejector board may reach from side-to-side of the front of the tipper body. Hereby, more residual load can be expelled from the tipper body.

In one example, the ejector board may reach from the bottom of the tipper body to at least midway to the upper edge of the tipper body. Again, in this way, an increased amount of residual load can be expelled from the tipper body.

In one example, the ejector board reach from the bottom of the tipper body to about one third towards the upper edge of the tipper body.

In one example, the ejector board is perforated. Perforations can act as passage for stuck material between the tipper body headboard and the ejector board, thus enabling for ejecting increased amounts of residual load. Furthermore, a perforated ejector board may reduce the weight of the ejector boar and consequently reduces the effort on the spring to increase its lifetime.

In one example, the ejector arm may pivotably attached to the tipper body. This may provide a convenient attachment location for the ejector arm.

In one example, the tipper arrangement may comprise two ejector arms attached to opposite edge portions of the ejector board. A benefit is that two ejector arms provide a more stable and even activation force on the ejector board. Furthermore, with one spring per ejector arm, a higher total force can be provided which may allow for more efficient expulsion of residual load. The ejector arms advantageously have a common pivot axis.

In one example, the ejector board may be a plate shaped headboard of the tipper body.

In one example, and to provide for efficient installation and operation, the tipper body may comprise a through-hole for each ejector arm through which the receptive at least one ejector arm is arranged.

In one example, the tipper arrangement may comprise two ejection arms being substantially L-shaped with a first end portion of the L-shaped ejector arm reaching inside the tipper body where it is attached to the ejector body being a headboard of the tipper body, and a second end portion of the L-shaped ejector arm reaching outside and to the underside of the tipper body, and, wherein L-shaped ejector arms have a common pivot axis where the first portion and the second portion of the substantially L-shaped ejector arm come together at an angle, wherein the actuator is a spring or a torsion bar, wherein the spring action is configured to push the second end portion of the at least one ejection arm away from the underside of the tipper body to cause the rotation of the ejector arms, wherein, in the an initial position of the ejector arm when the tipper body is in a neutral position, the mechanical contact with the stopper element prevents rotation of the at least one ejection arm under the spring action, and wherein when the tipper body is tilted for an unloading action, the mechanical contact between the stopper element and the ejector arm is lost so that the spring or torsion bar acts on the ejector arm to cause a rotation about the pivot axis and thereby a motion of the ejector board towards the rear of the tipper body to expel load from the tipper body.

According to a second aspect of the disclosure, there is provided a vehicle comprising a tipper body and the tipper arrangement according to the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 1 is an exemplary prior art truck with a tipper structure;

DETAILED DESCRIPTION

Aspects set forth below represent the necessary information to enable those skilled in the art to practice the disclosure.

FIG. 1 illustrates a typical prior art tipper truck 1000, or sometimes referred to as dumping truck or dump trailer, having a tipper structure 1002 for carrying a load, typically for construction or mining such as macadam, sand, coal, dirt, to mention a few examples. During an unladen cycle where cargo 5 should be unloaded from the tipper structure 1002, it often occurs that material 5 gets stuck on the tipper structure 1002, typically in front area A of the tipper structure 1002 but also flat on the bottom surface in area B of the tipper structure 1002. This stuck material leads to deadweight in subsequent laden cycles since the tipper capacity is reduced for payload. The examples discussed herein aim to at least alleviate this problem.

Figure 2A:
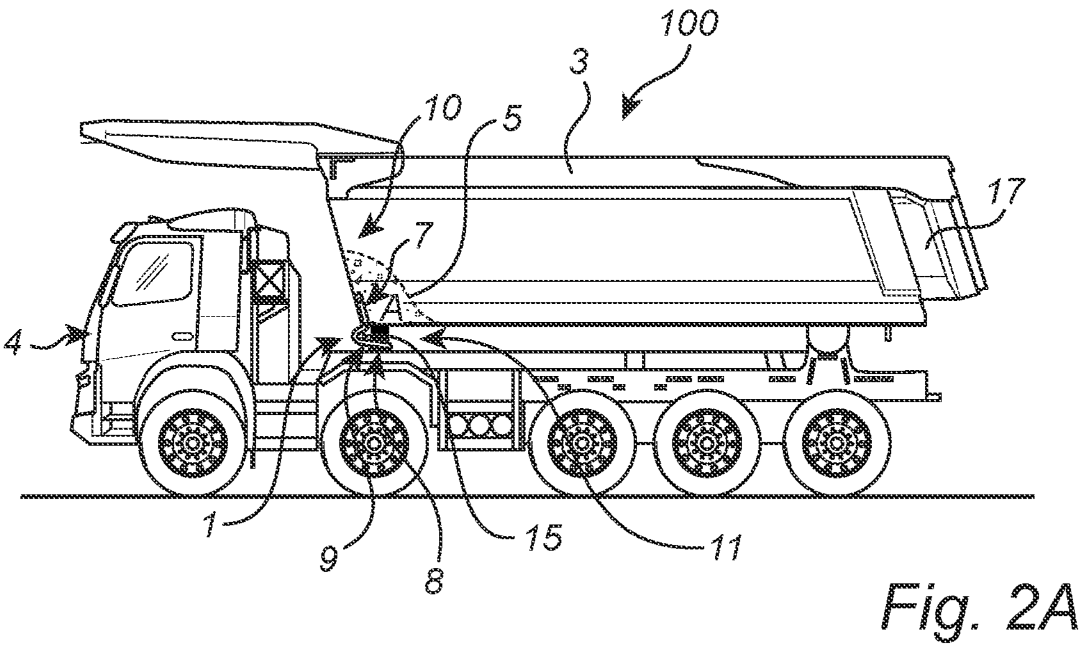
FIG. 2A is an exemplary is an exemplary vehicle with a tipper arrangement and a tipper body in an initial position.

FIG. 2A is an exemplary vehicle 100 according to one example. The vehicle comprises a tipper arrangement 1 and a tipper body 3 for carrying a load 5, here only shown in the front region A of the tipper body 3.

The tipper arrangement 1 comprises a movable ejection board 7 mechanically attached to at least one an ejection arm 9 at the front 10 of the tipper body inside the tipper body. The front of the tipper body is at the end of the tipper body facing towards the cab 4 of the vehicle in the forward driving direction of the vehicle 100. The at least one ejection arm 9 is pivotable attached with respect to the tipper body 3 and extend to below the tipper body 3 towards a chassis 8 of the vehicle 100. Below the tipper body 3 is here between, e.g., sandwiched between the tipper body 3 and the chassis 8.

Figure 2B:
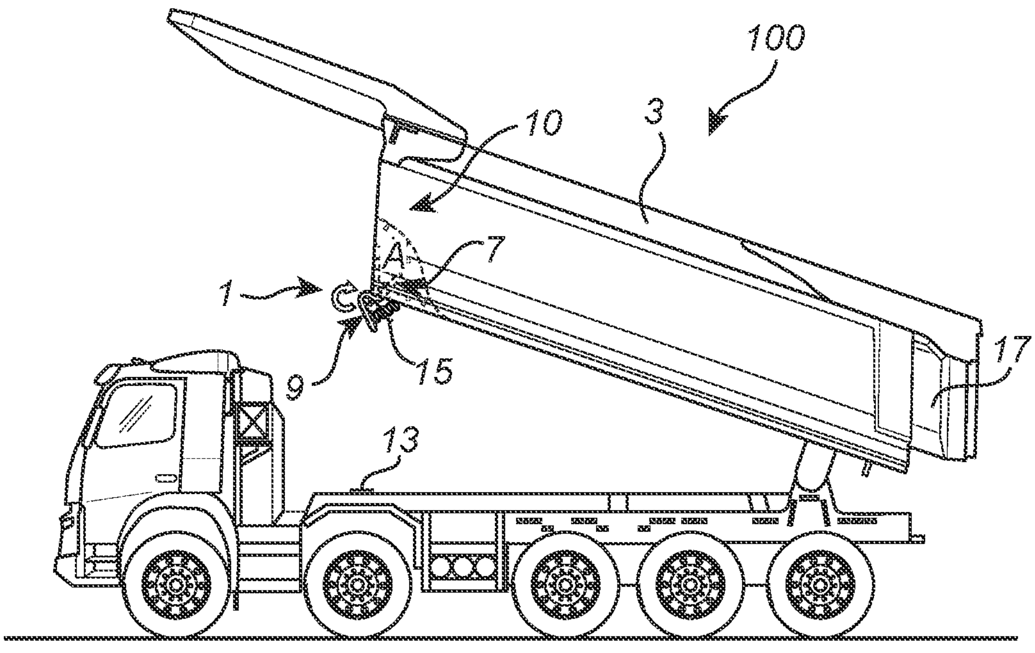
FIG. 2B is an exemplary is an exemplary vehicle with a tipper arrangement and a tipper body in an unladen position.

Further, the tipper arrangement 1 comprises an actuator 11 provided as a spring 11 or a torsion bar, configured to rotate the at least one ejection arm 9 from an initial position, shown in FIG. 2A, in which the at least one ejection arm 9 is in mechanical contact with a stopper element 13, better seen in FIG. 2B, below the tipper body 3 that prevent rotation of the at least one ejection arm, to a rotated position, better seen in FIG. 2B, in which the at least one ejection arm 9 is rotated about a pivot axis 15 to cause a motion of the ejector board 7 towards the rear 17 of the tipper body to expel load from the front 10 of the tipper body 3. In the initial position of the ejection arm, the tipper body 3 is in a normal loading position shown in FIG. 2A. Thus, the tipper body 3 is in a generally horizontal orientation so that load maintains in the tipper body 3.

The actuator 11 is herein depicted as a spring, but may equally well be replaced by a torsion bar performing the same function as the spring 11, thus providing a spring force that cause rotation of the ejection arm 9.

Figure 2C:
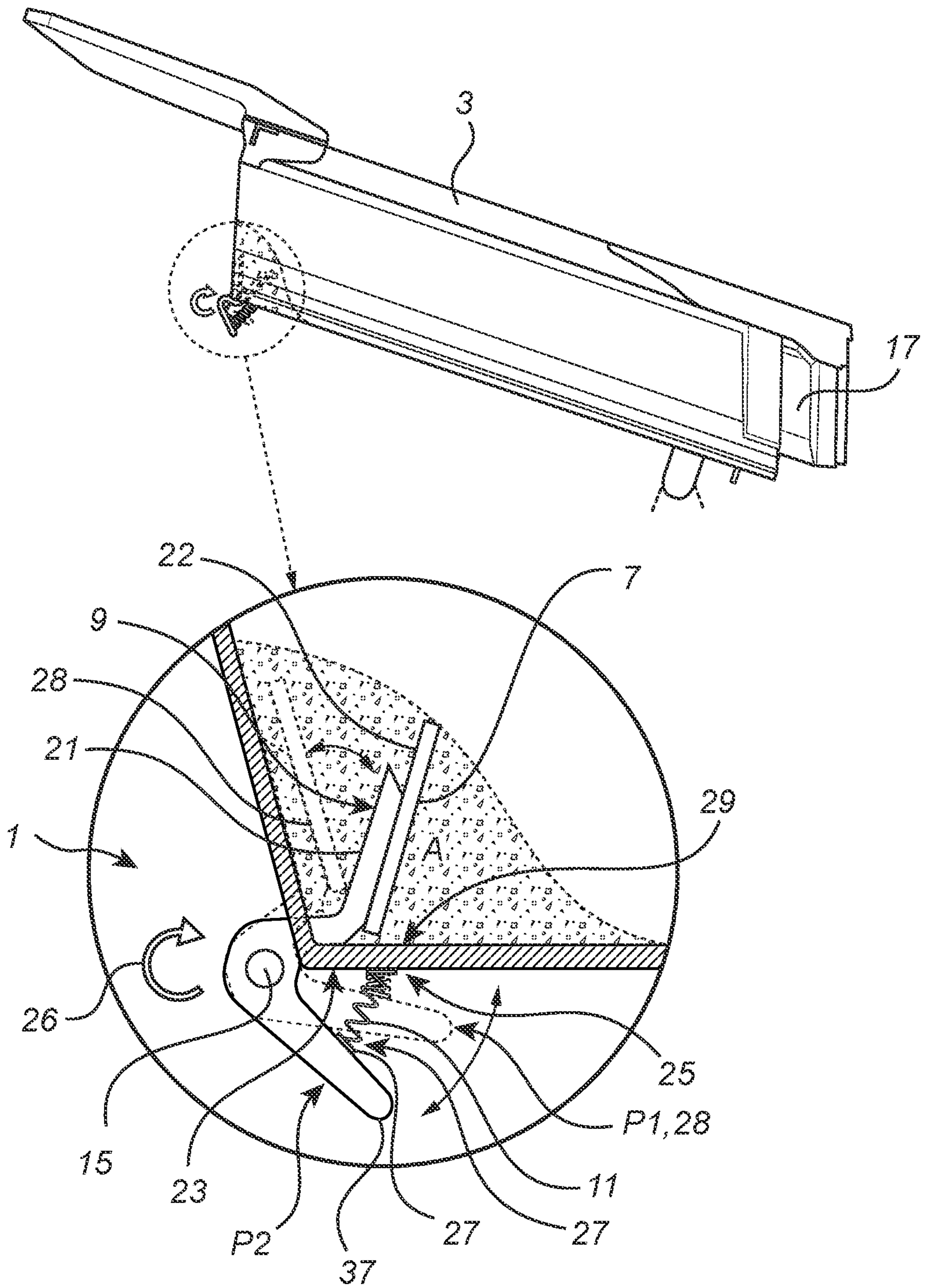
FIG. 2C is a close-up view of an exemplary tipper arrangement in FIG. 2A and FIG. 2C.

FIG. 2C is a close-up view of the tipper arrangement 1. Here, in this side-view a single ejection arm 9 that is substantially L-shaped is shown being attached to a rear side 22 of the ejection board 7. The rear side 22 faces towards the front 10 of the tipper body 3, in the direction of the vehicle cab 4, at least in the initial position of the ejection board 7. More specifically, the ejection board 7 is mechanically connected to a first end portion 21 of the at least one ejection arm 9. The first end portion 21 is on one end of the ejection arm with respect to the pivot point defining the pivot axis 15. The ejection arm 9 further comprises a second end portion 37 which provides a mechanical contact between the at least one ejection arm 9 and the respective stopper element 13. The second end portion 37 is on the opposite end of the ejection arm 9 with respect to the pivot axis 15. This means that if the second end 37 is pushed downwards, i.e., away from the underside 23 of the tipper body 3, the ejection arm 9 rotates clockwise in FIG. 2C as indicated by the directional arrow 26 about the pivot axis 15. This rotation causes a displacement of the ejection arm 9 from its initial position P1 indicated in dashed lines 28 to a rotationally displaced position P2. Since the ejection board 7 is attached to the first end portion 21, the ejection board 7 is tilted towards the rear 17 of the tipper body to move stuck material A towards the rear 17.

The spring 11 or torsion bar is biased between the ejection arm 9 and the tipper body 3. More specifically, the spring 11 is arranged under the tipper body biased between the second end portion 37 the at least one ejection arm 9 and the underside 23 of the tipper body 3. Thus, in the initial position P1 of the ejection arm 9, the spring is compressed between the side 23 of the tipper body and the second end portion 37 of the ejection arm 9. As long as the tipper body in is its horizontal portion, the second end portion 37 is in contact with the stopper element preventing a rotation of the ejection arm 9 about the pivot axis 15. Consequently, the spring 11 is kept biased, or compressed, until the contact between the second end portion 37 and the stopper element 13 is lost.

When the tipper body 3 is tilted i.e., due to a unladen cycle, the pressure between the second end portion 37 and the stopper element 13 reduces which allows the spring to decompress. The spring action push the second end portion 37 of the at least one ejection arm 9 away from the underside 23 of the tipper body 3 and cause the rotation of the ejection arm about the pivot axis 15.

The spring 11 or torsion bar is attached to the underside 23 of the tipper body 3. The attachment is mechanical and is made by for example bolting or welding. In this case, a spring 11 has a fixed end 25 attached to the tipper body 3 and a free end 27 that push on the ejection arm 9. The free end 27 may lose contact with the ejection arm 9 during an unladen cycle when the ejection arm 9 has rotated through a sufficiently large rotation angle.

Figure 3:
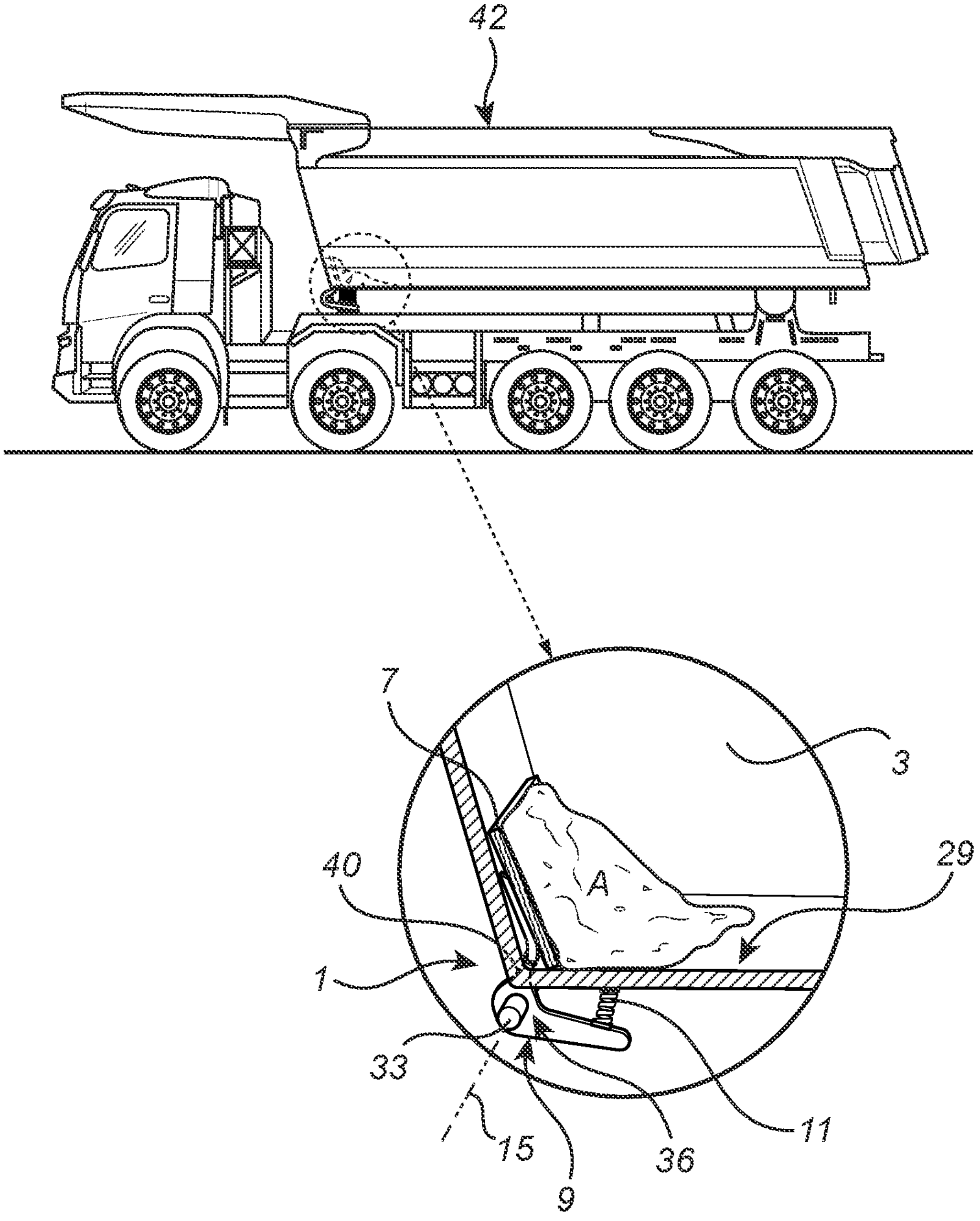
FIG. 3 is a perspective view of an example tipper arrangement installed in a tipper body.

FIG. 3 is a perspective view of the tipper arrangement 1 installed in the tipper body 3. The ejection arm 9 is attached to the tipper body 3 by an axle 33 that allow for the ejection arm 9 to rotate about the rotation axis 15. A bushing or a bearing arrangement of the axle 33 may provide for the rotation of the ejection arm 9 about the axis 15. The axle 33 may be fixedly attached to the tipper body and the ejection arm 9 is rotatable with respect to the axle 33. For example, the axle 33 may be welded or bolted to the tipper body 3, and the axle may be fitted through holes 36 in the ejection arm 9 having slightly larger diameter than the diameter of the axle 33. Furthermore, the axle 33 may Equally, the axle 33 may be fixedly attached to the ejection arm 9 while being rotatable about the axis 15 with respect to the tipper body 3. The axle 33 may be welded or bolted to the ejection arm 9. In this case, the axle 33 may be fitted through holes in attachment brackets of the tipper body 3 having slightly larger diameter than the diameter of the axle 33. The ejector board 7 may be plate shaped and be part of a headboard of the tipper body.

Furthermore, to allow the ejector arm 9 to reach inside the tipper body 3 at the front 10, the tipper body 3 comprises a through-hole 40 for each ejector arm through which the receptive at least one ejector arm 9 is arranged.

Figure 4A:
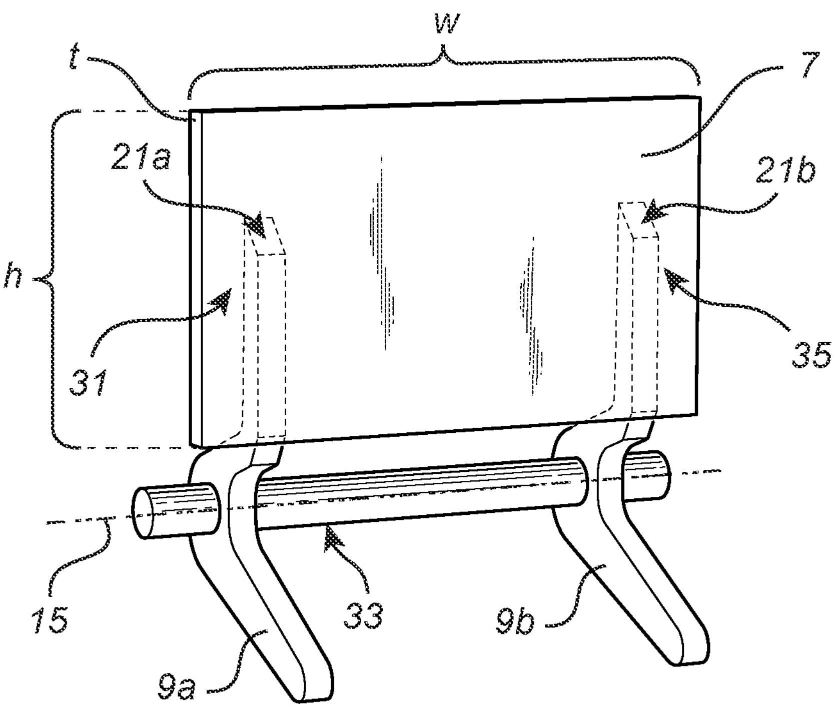
FIG. 4A is a perspective view of an example ejector board attached to two ejector arms.

FIG. 4A is a perspective view of the ejector board 7 being attached to the second portions 21*a*, 21*b* of respective ejector arms 9*a*, 9*b*. An axle 33 is coupled to the ejector arms 9*a* and 9*b* to form a common pivot axis 15 for the ejector arms 9*a*, 9*b*. In this example, the two ejector arms 9*a*, 9*b* are attached to opposite edge portions 31, 35 of the ejector board. Thus, two ejector arms 9*a*, 9*b* are attached to the ejector board 7 so that they are closer to the respective side edge that they are to each other. The edges portions 31 and 35 are on either side of the ejector board 7 along the width W.

The ejector board 7 has dimensions being a width W and a height h, and thickness t. The width W is in the side-to-side direction of the tipper body, along a transverse axis of the vehicle 100 when the tipper arrangement is operationally installed in a vehicle 100. The height h is perpendicular to the width W, and the smallest dimension of the ejector board 7 is the thickness t. The thickness t is substantially smaller than the height h and width W. Further, the ejector board 7 is relatively planar, or plate shaped.

With further reference to FIG. 3, preferably, the ejector board 7 reach from side-to-side of the front 10 of the tipper body 3. In other words, the width W of the ejector board 7 may be only slightly smaller than the width of the tipper body 3 so that ejector board 7 fits inside the width of the tipper body 3.

To further improve the ability for the tipper arrangement 1 to eject residual material from the tipper body, the height h of the ejector board 7 reach from the bottom 29 of the tipper body 3 to at least midway to the upper edge of the tipper body 3. In a further example, the ejector board 7 reaches from the bottom 29 of the tipper body 3 to about one third towards the upper edge 42 of the tipper body 3.

The first portion 21, 21*a*, 21*b* of the ejector arm 9, 9*a*, 9*b*, may be welded or bolted to the ejector board 7.

Figure 4B:
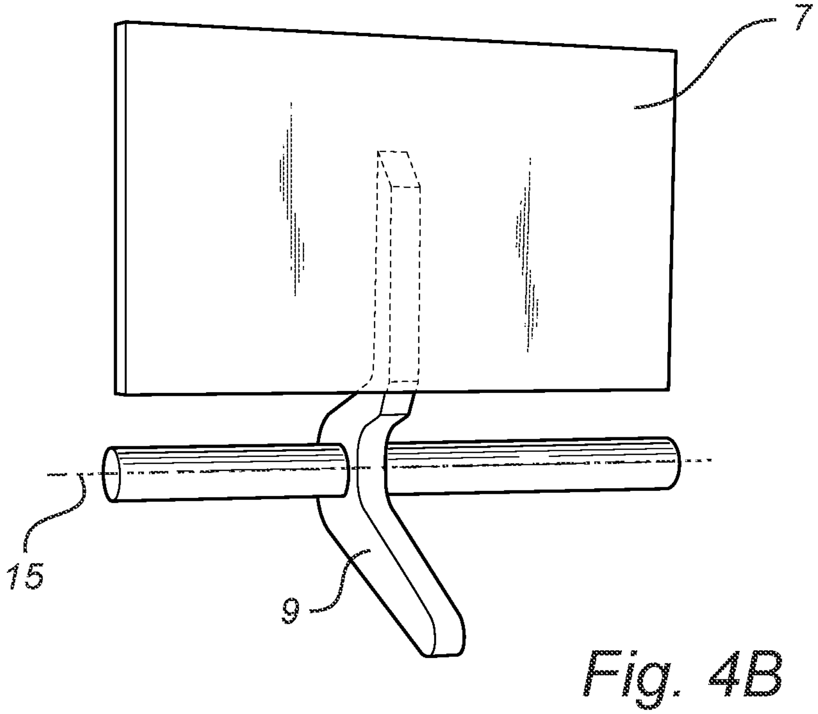
FIG. 4B is a perspective view of an example ejector board attached to on ejector arm.

FIG. 4B is a perspective view of a further example where a single ejector arm 9 is attached to the ejector board 7. It is envisaged that two or more ejector arms 9 are possible and within possible developments of the preset disclosure.

Figure 4C:
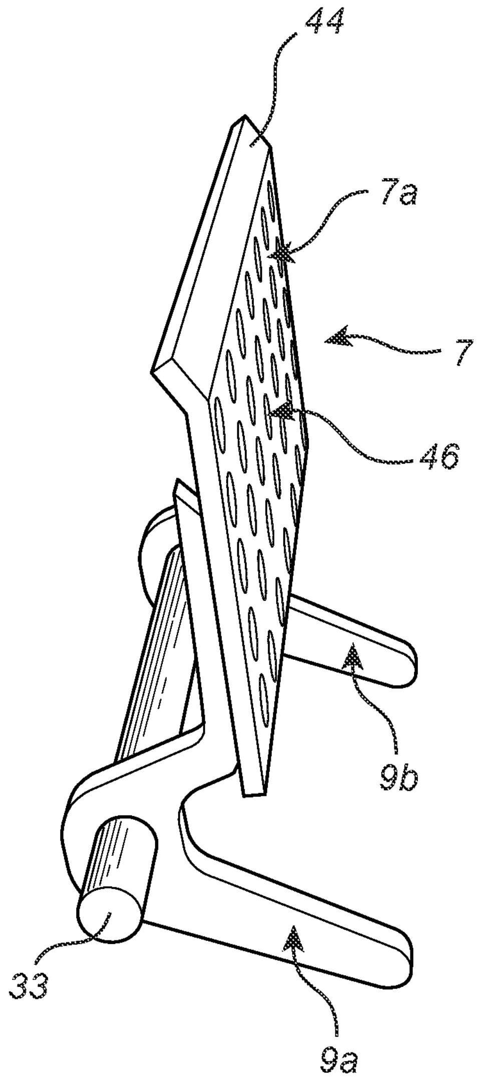
FIG. 4C is a perspective view of an example perforated ejector arm attached to ejector arms.

FIG. 4C is a further perspective view of a further example where the ejector board 7 comprises an upper lip 44 that bends at an angle from the otherwise planar main body 7*a* of the ejector board 7. The lip 44 bends towards the front of the tipper body 3 to prevent material from falling in behind the ejector board 7.

Furthermore, the ejector boards described herein may be perforated. Thus, the ejector board comprises a matrix of through-holes 46 reaching through the thickness t of the ejector board 7. The entire ejector board may be perforated, that is the matrix may cover the entire ejector board.

The ejector arms and ejector boards presented herein are preferably made from a strong material such as a metal, e.g., steel or so-called Hardox® steel (SSAB). The spring is also preferably made from e.g., steel.

It is envisaged that the tipper arrangement 1, comprising two ejection arms 9*a-b* being substantially L-shaped with a second portion 37 of the L-shaped ejector arm reaching outside and to the underside of the tipper body 3, and a first portion 21 of the L-shaped ejector arm reaching inside the tipper body 3 where it is attached to the ejector body 7 being a headboard of the tipper body. The L-shaped ejector arms 9*a-b* have a common pivot axis where the first portion and the second portion of the substantially L-shaped ejector arm come together at an angle. Further, in this example, the actuator is a spring 11 or a torsion bar, wherein the spring action is configured to push the first end portion of the at least one ejection arm 9 away from the underside of the tipper body 3 to cause the rotation of the ejector arms. In the initial position of the ejector arm when the tipper body 3 is in a neutral position, or loading, or horizontal position, the mechanical contact with the stopper element 13 prevents rotation of the at least one ejection arm 9 under the spring action, and when the tipper body 3 is tilted for an unloading action, the mechanical contact between the stopper element and the ejector arm is lost so that the spring acts on the ejector arm 9*a-b* to cause a rotation about the pivot axis 15 and thereby a motion of the ejector board towards the rear of the tipper body 3 to expel load from the tipper body.

It is envisaged that the actuator may be one of, or may be assisted by one of a pneumatic actuator, a hydraulic actuator, and an electric actuator. In such arrangements, the actuator is activated in response to that the at least one ejection arm 9 loses contact with the stopper element 13.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A tipper arrangement for a vehicle, comprising:

a tipper body for carrying a load;

a movable ejection board mechanically attached to at least one ejection arm at a front of the tipper body inside the tipper body, the at least one ejection arm is pivotably attached with respect to the tipper body and extends to below the tipper body;

an actuator configured to rotate the at least one ejection arm from an initial position in which the at least one ejection arm is in mechanical contact with a stopper element below the tipper body that prevents rotation of the at least one ejection arm, to a rotated position in which the at least one ejection arm is rotated about a pivot axis to cause a motion of the ejection board towards the rear of the tipper body to expel the load from the front of the tipper body.

2. The tipper arrangement of claim 1, wherein, when the tipper body is in a normal loading position the at least one ejection arm is in mechanical contact with the stopper element.

3. The tipper arrangement of claim 1, wherein the ejection board is mechanically attached to a first end portion of the at least one ejection arm on one side of the pivot point of the at least one ejection arm and the mechanical contact between the at least one ejection arm and the stopper element is on a second end portion of the at least one ejection arm on an opposite side of the pivot point.

4. The tipper arrangement of claim 1, the at least one ejection arm being substantially L-shaped.

5. The tipper arrangement of claim 1, wherein the actuator is a spring.

6. The tipper arrangement of claim 5, wherein the spring is biased between a first end portion the at least one ejection arm and the underside of the tipper body, wherein the spring action pushes the first end portion of the at least one ejection arm away from the underside of the tipper body.

7. The tipper arrangement of claim 5, wherein a fixed end of the spring is attached to the tipper body and the other end is a free end that pushes on the actuator arm.

8. The tipper arrangement of claim 1, wherein the actuator is assisted by one of a pneumatic actuator, a hydraulic actuator, and an electric actuator.

9. The tipper arrangement of claim 8, wherein the actuator is activated in response to the at least one ejection arm losing contact with the stopper element.

10. The tipper arrangement of claim 1, the ejection board reaches from side-to-side of the front of the tipper body.

11. The tipper arrangement of claim 1, wherein the ejection board reaches from the bottom of the tipper body to at least midway to the upper edge of the tipper body.

12. The tipper arrangement of claim 1, wherein the ejection board reaches from the bottom of the tipper body to about one third towards the upper edge of the tipper body.

13. The tipper arrangement of claim 1, wherein the ejection board is perforated.

14. The tipper arrangement of claim 1, wherein the ejection arm is pivotably attached to the tipper body.

15. The tipper arrangement of claim 1, wherein the at least one ejection arm comprises two ejection arms attached to opposite edge portions of the ejector board.

16. The tipper arrangement of claim 15, wherein the ejection arms have a common pivot axis.

17. The tipper arrangement of claim 1, wherein the ejection board is a plate shaped headboard of the tipper body.

18. The tipper arrangement of claim 1, wherein the tipper body comprises a through-hole for the at least one ejection arm through which the respective at least one ejector arm is arranged.

19. The tipper arrangement of claim 1, wherein the at least one ejector arm comprises two ejection arms being substantially L-shaped with a first portion of the L-shaped ejection arm reaching outside and to the underside of the tipper body, and a second portion of the L-shaped ejector arm reaching inside the tipper body where it is attached to the ejector body being a headboard of the tipper body, wherein the L-shaped ejection arms have a common pivot axis where the first portion and the second portion of each substantially L-shaped ejection arm come together at an angle, wherein the actuator is a spring that is biased between the first portion of at least one of the ejection arms and the underside of the tipper body, wherein the spring action is configured to push the first end portion of each ejection arm away from underside of the tipper body to cause the rotation of the ejector arms, wherein, in the an initial position of each ejector arm when the tipper body is in a neutral position, the mechanical contact with the stopper element prevents rotation of the at least one ejection arm under the spring action, and wherein when the tipper body is tilted for an unloading action, the mechanical contact between the stopper element and each ejector arm is lost so that the spring acts on each ejector arm to cause a rotation about the pivot axis and thereby a motion of the ejector board towards the rear of the tipper body to expel load from the tipper body.

20. A vehicle comprising the tipper body and the tipper arrangement according to claim 1.

* * * * *